SPACED-PULSE IMPULSE SENDER

Filed Dec. 8, 1949 4 Sheets-Sheet 1

INVENTOR
D. B. PARKINSON
BY William F. Simpson
ATTORNEY

April 1, 1952 D. B. PARKINSON 2,590,885

SPACED-PULSE IMPULSE SENDER

Filed Dec. 8, 1949 4 Sheets-Sheet 2

INVENTOR
D. B. PARKINSON
BY
William F. Simpson
ATTORNEY

INVENTOR
D. B. PARKINSON
BY William F. Simpson.
ATTORNEY

April 1, 1952 D. B. PARKINSON 2,590,885

SPACED-PULSE IMPULSE SENDER

Filed Dec. 8, 1949 4 Sheets-Sheet 4

FIG. 10

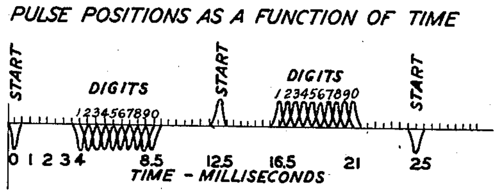

FIG. 10A
GENERATION OF START PULSES

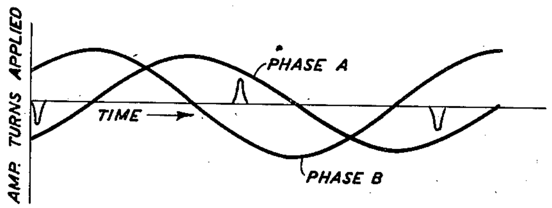

FIG. 10B
GENERATION OF PULSES REPRESENTING DIGIT 1

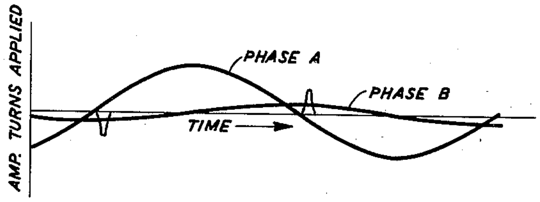

FIG. 10C
GENERATION OF PULSES REPRESENTING DIGIT 2

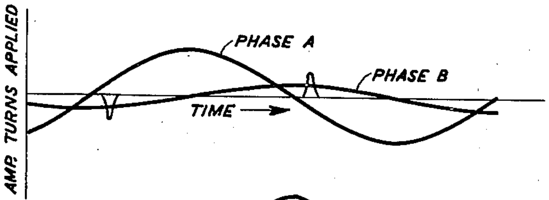

FIG. 10D
GENERATION OF PULSES REPRESENTING DIGIT 0

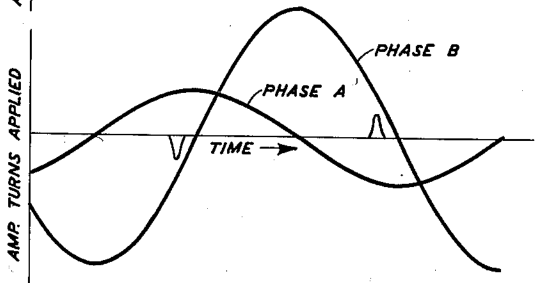

FIG. 10E
THE START PULSES AND PULSES REPRESENTING THE DIGIT 2 AS APPLIED TO THE LINE DURING ONE CYCLE OF THE EXCITATION CURRENT.

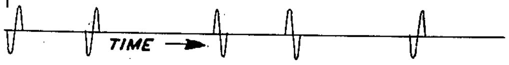

INVENTOR
D. B. PARKINSON
BY William F. Simpson.
ATTORNEY

Patented Apr. 1, 1952 2,590,885

UNITED STATES PATENT OFFICE 2,590,885

SPACED-PULSE IMPULSE SENDER

David B. Parkinson, Cleveland Heights, Ohio, assignor to Bell Telephone Laboratories, Incorporated, New York, N. Y., a corporation of New York Application December 8, 1949, Serial No. 131,875

4 Claims. (Cl. 179—90)

This invention relates to improvements in telephone call signal apparatus, circuits, and methods, and more specifically to improvements in telephone call signaling apparatus, circuits, and methods disclosed in an application of Parkinson, Serial No. 39,015, filed July 16, 1948, now Patent No. 2,499,606, granted March 7, 1950, which calling apparatus and circuits are of the preset type and generate pulses of electric current which may be transmitted over voice frequency telephone channels.

An object of the present invention is to simplify and reduce the amount of equipment necessary at a subscriber's station for generating electrical signaling current pulses of the type required in systems such as set forth in the above-identified Parkinson patent application.

Another object of this invention is to reduce interfering currents and require less power for generating the signaling pulses by generating only those pulses which are necessary to transmit the necessary signals over the subscriber's line.

In the above-identified application call signal generating apparatus is disclosed for generating pulses in which the magnitude or identity of each digit of the called subscriber's station identification or number is represented by the time elapsing between a start or reference pulse and a stop or digit pulse. In transmitting pulses of short duration over voice frequency transmission paths difficulty is frequently encountered due to transients set up by the pulses. The transients are usually decaying alternating currents which are caused by resonant circuits incorporated in transmission paths, repeat coils, filters, and other transmission equipment. Transients resulting from the application of short pulses to such equipment frequently last a number of cycles and thus form an appreciable interval of time after an exciting pulse has terminated.

In accordance with the invention set forth in the above-identified patent application of Parkinson, the signaling pulses are spaced in time so that ample time is allowed for the transients, associated with or appearing incident to the application of each of the signaling pulses to the transmission system, to die out sufficiently so that they will not interfere with the next signaling pulse, thus preventing interaction between the various pulses representing the digits of the called number.

In the above-identified application, eleven impulse coils each comprising a core of saturable material and a plurality of windings were provided for generating the various pulses. Thus the start pulse and ten stop pulses were generated for each digit and selecting means provided for selecting the desired one of the stop pulses.

In accordance with the present invention only two impulse coils each having a core of saturable material and a plurality of windings are provided, one for generating the start pulse and one for generating the stop pulse. The time of generation of the stop pulse is controlled by a selective switch and distributor which varies the number of turns in one of the windings of the stop pulse coil. Such an arrangement requires less power which is usually supplied over the subscriber's line, and in addition prevents cross-talk or interference from the coils not selected when all of the stop pulses are generated for each digit as disclosed in the arrangement described in the above-identified application of Parkinson.

These and other objects and features of the invention will be apparent from the following description, the appended claims, and the drawings, in which:

Figure 1:
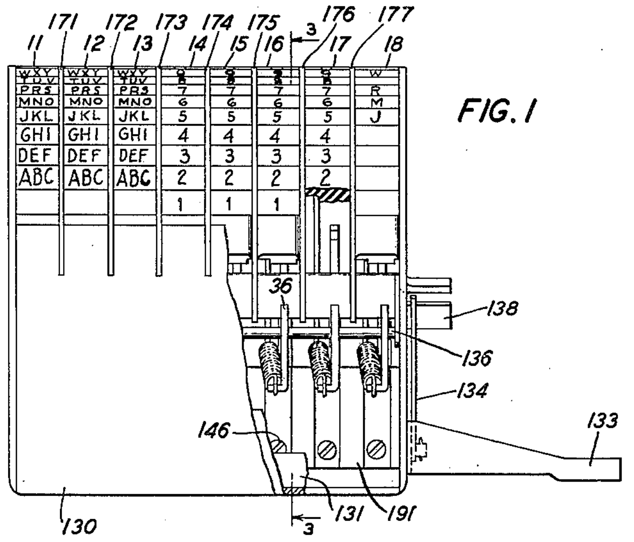
Fig. 1 is a front view, partially broken away, of the dialing apparatus.

Fig. 10 indicates the pulse positions as a function of time;

Fig. 10A indicates the start pulses generated in the secondary winding and the ampere-turns in the primary winding of the transformer for generating the start pulse during one cycle of the excitation current;

Fig. 10B indicates the stop pulses generated in the secondary winding and the ampere-turns in each of the primary windings of the transformer for generating the pulses representing the digit 1 during one cycle of the excitation current;

Fig. 10C indicates the stop pulses generated in the secondary winding and the ampere-turns in each of the primary windings of the transformer for generating the pulses representing the digit 2 during one cycle of the excitation current;

Fig. 10D indicates the stop pulses generated in the secondary winding and the ampere-turns in each of the primary windings of the transformer for generating the pulses representing the digit 0 during one cycle of the excitation current; and Fig. 10E indicates the start pulses and the stop pulses representing digit 2 as generated during one cycle of the excitation current.

The manner in which the apparatus disclosed in this application may be incorporated in a complete telephone system is disclosed in copending application Serial No. 35,925 of W. A. Malthaner filed June 29, 1948. Suitable types of equipment for responding to the signaling pulses transmitted from the apparatus disclosed herein are disclosed in the copending applications of H. E. Vaughan, Serial No. 35,911, filed June 29, 1948; and W. A. Malthaner, N. D. Newby, and H. E. Vaughan, Serial No. 35,924, filed June 29, 1948.

A similar signaling device is disclosed in copending applications Serial No. 35,930 of D. B. Parkinson filed June 29, 1948, Serial No. 35,927 of C. A. Lovell et al. filed June 29, 1948, and Serial No. 35,926 of C. A. Lovell and D. B. Parkinson, filed June 29, 1948, now Patent No. 2,587,635, granted March 4, 1952. Novel features disclosed but not claimed herein are claimed in different ones of the above-identified applications.

In the exemplary embodiment shown, provision is made for the generation of pulse representations of eight characters during each cycle of operation, and these pulses are repeatedly generated as long as the excitation current is applied. Any arbitrarily chosen number of representatioins of characters (within reasonable limits) may be generated by properly designed signaling apparatus. A maximum of eight representations of characters was selected for this disclosure since eight-character calling numbers are in common use in telephone systems. It will be understood that these characters may be digits or lettesr or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1-millisecond duration is in effect lengthened to a decaying alternating current of approximately 3½-millisecond duration. At the end of this 3½-millisecond period or any time thereafter a second pulse may be transmitted.

The signaling system employed in this embodiment of the invention comprises a start pulse of 1-millisecond duration for each character, the start pulses being generated at 12½-millisecond intervals as long as the pulsing transformers are energized, and a stop pulse of 1-millisecond duration for each character, each stop pulse reaching its peak value during the 4- to 8½-millisecond intervals of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number. In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the corresponding no-signal period.

In accordance with this exemplary embodiment of the invention the signaling pulses are generated by saturation-type pulse generating transformers. There are two transformers, one for the digit pulse representing the digits 0 to 9 and one for the start or reference pulse. The excitation current for the apparatus of the exemplary embodiment set forth herein is sinusoidal in form and is usually transmitted from a power station at the central office over the line which interconnects the signaling station with the central office. This current is an alternating current of sinusoidal wave form, and at the signaling station the current is passed through a phase shifting network so that the current is converted to a two-phase source in which the two currents are substantially 90 degrees out of phase.

Of course the exciting current may be supplied locally at the subscriber's station when so desired or required.

Each of the pulse generating transformers has a single output winding and two input windings. The input windings of the transformers are interconnected and connected with the two phases of the excitation current so that one phase of the excitation current is applied to one input winding of each transformer and so that the other phase of the excitation current is applied to the other input winding of each transformer. The secondary windings of the transformers are connected across the line.

One of the input windings of the stop or digit pulse transformer is tapped and power of the proper phase applied to one of the taps through a selector switch and a distributor.

The magnetic core of each transformer is designed to be saturated except for very small values of ampere-turns, and an electric pulse is generated in the secondary winding of each transformer when the flux is changed from saturation at one polarity to saturation at the other polarity. The flux induced in the core of each transformer depends upon the number of turns in the two primary windings of the transformer and upon the current flowing in each winding.

As shown in the drawing both the start pulse coil 310 and the stop or digit pulse coil 301 are provided with two primary windings thus allowing adjustment of the time of occurrence of both the start pulse and stop pulses relative to the respective phases of the occurrence applied to these windings.

When desired, only one of the input windings of the start pulse coil may be employed in which case the pulse is generated when the current of the applied phase goes through zero.

As shown in the drawing the stop pulse coil is provided with a fixed input winding connected to phase A from network 202 and a tapped input winding connected to phase B from network 203. The taps of the winding are connected to ground and thus to the source of alternating current and the particular tap to which ground is connected determines the number of ampere turns applied to the core of the transformer 301 and in this manner controls the time of occurrence of the induced pulse in its output circuit.

The manner in which the number of ampere-turns applied to the winding connected to phase B of the stop pulse coil 301 controls the time of occurrence of the output pulse may be more readily understood by reference to Fig. 10 and Figs. 10A, 10B, 10C, 10D and 10E.

Fig. 10 shows the possible times of occurrence of the start pulses. Thus, in the exemplary embodiment set forth herein there are ten different times during which a stop pulse may occur designating the identity of the digit or symbol of the called subscriber's station designation.

Fig. 10A shows the ampere-turns applied to the core of the start pulse coil 310 by both phases A and B.

Fig. 10B shows the ampere-turns applied to the core of coil 301 when it is desired to generate a pulse representing the digit 1. In this case the number of ampere-turns of phase B is increased. The ampere-turns of phase A remain constant with the result that the time of occurrence of the output pulse is appreciably delayed as shown in Fig. 10B. Figs. 10C and 10D show progressively a greater number of ampere-turns applied to the core of transformer 301 by phase B to represent the higher digits. As progressively more and more turns are included in the winding connected to phase B the output pulse is progressively delayed in time thus giving rise to the generation of the various stop pulses.

With the above-described arrangement, wherein the number of ampere-turns from phase A is maintained constant while the number of ampere-turns obtained from phase B is progressively increased for digits designated progressively in larger numbers, the total number of ampere-turns applied by the windings to the core is progressively increased. However, inasmuch as the pulses are generated only during the time the total flux passes through zero as described above and due to the fact that the core is saturated at a low number of ampere-turns, variations in the amplitude of the output pulse under different signaling conditions are substantially reduced or eliminated. Such variations as may occur between the various pulses are limited largely to variations in the time duration of the pulses.

The output or secondary windings on both coils 301 and 310 are connected in series and the series combination of these coils connected through condenser 205, distributor segment 82, distributor brush 81, distributor segment 80, and then to the subscriber's line extending to the central office. This line is closed through distributor segment 81 and distributor brush 82 at all times except during the pause between the subscriber's designations. During this pause neither of the output circuits nor output windings of the pulse coils are connected to the line extending to the central station. Consequently, they transmit no pulses during this silent interval.

The condenser 205 is connected in series with the series combination of the output windings of these coils to the line extending to the central office. This condenser and coil windings are provided to control the shape and duration of the pulses. The capacity of this condenser is selected so that the products of its capacity and the resistances in the circuit is less than the pulse time so that the shape of the pulse transmitted to the line is largely determined by the constants of this condenser and the other circuit elements. The condenser 205 represents a simple coupling network. However, any coupling network with suitable degree of complexity which will provide the necessary shaping of the pulses may be employed.

It should be noted that a pulse is generated for each half cycle of the applied current in both the start pulse coil 310 and the stop pulse coil 301. It should also be noted as shown in Fig. 10 as well as Figs. 10A, B, C and D that a start pulse and its accompanying stop pulse are of one polarity while the next stop pulse and next start pulse are both of the same polarity but of opposite polarity to the immediately preceding start and stop pulses.

Line 10E shows the pulses transmitted over the line to the central station where they control switches as described hereinbefore for setting up communication paths.

Figure 3:
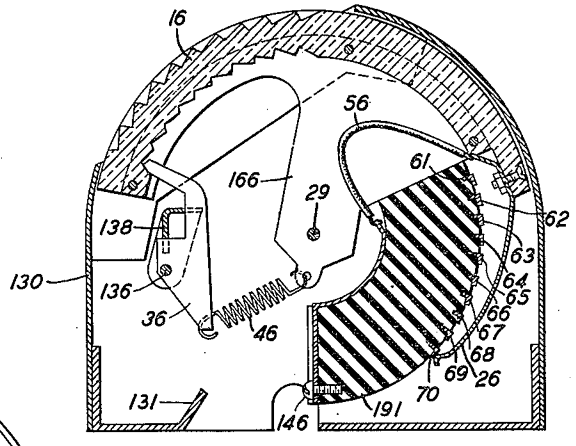
Fig. 3 shows a section taken along section line 3 of Fig. 1.
Figure 2:
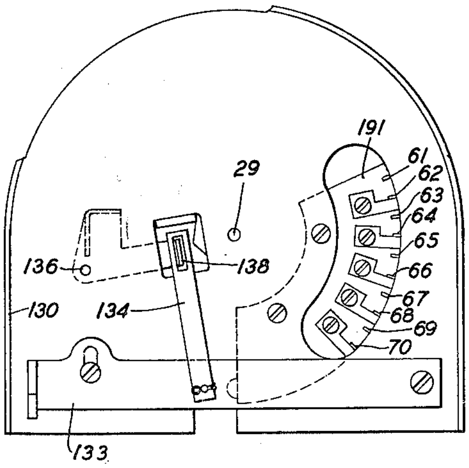
Fig. 2 is a side view of the same apparatus.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial.

The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figs. 5, 6, 7, 8 and 9 indicate one embodiment of the stepping device and distributor. The distributor comprises two brushes 113 moving over a set of contacts. Contacts 91 to 98 and the eight contacts bonded by conductor 114 serve as distributor elements. The brushes are driven by ratchet wheel 206 through shaft 207. The ratchet wheel is driven by stepping pawls 208 and 209 which are attached to magnetic reed 210. The magnetic structure is polarized by permanent magnet 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves upward or downward, ratchet wheel 206 is moved one step by one of the stepping pawls. Thus, ratchet wheel 206 and rotor 113 are moved one step during each half cycle of the alternating current.

Figure 4:
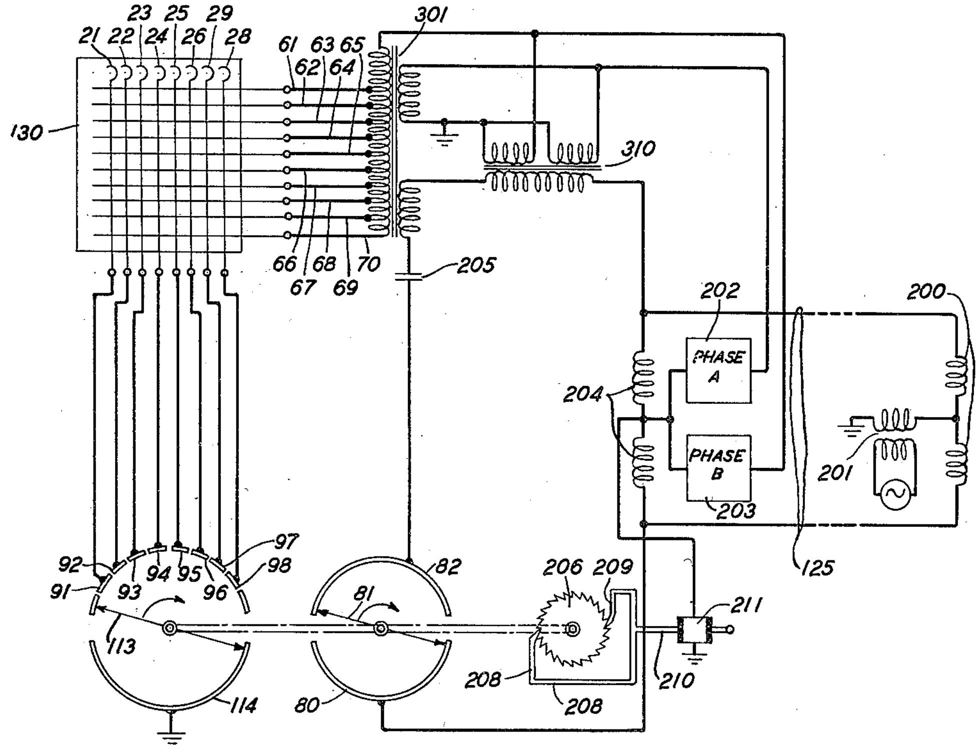
Fig. 4 shows the manner in which the dial, the stepping mechanism, the pulsing transformers, and other equipment are interconnected to cooperate one with another and with the telephone line.
Figure 5:
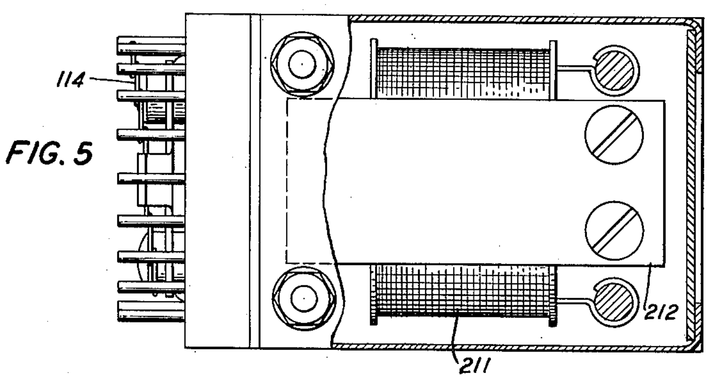
Fig. 5 is a top view, partially broken away, of the stepping mechanism.
Figure 7:
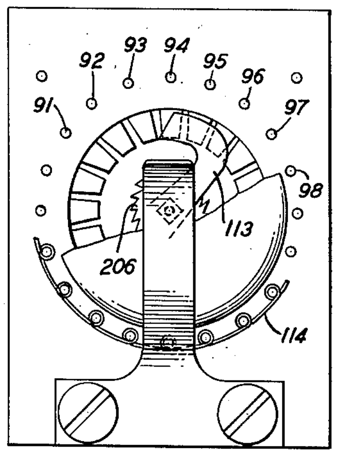
Fig. 7 is a front view, partially broken away, of the stepping mechanism.
Figure 6:
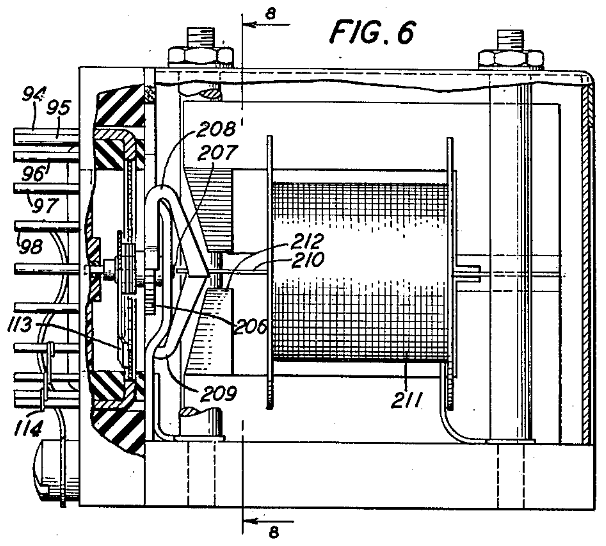
Fig. 6 is a side view, partially broken away, of the stepping mechanism.
Figure 8:
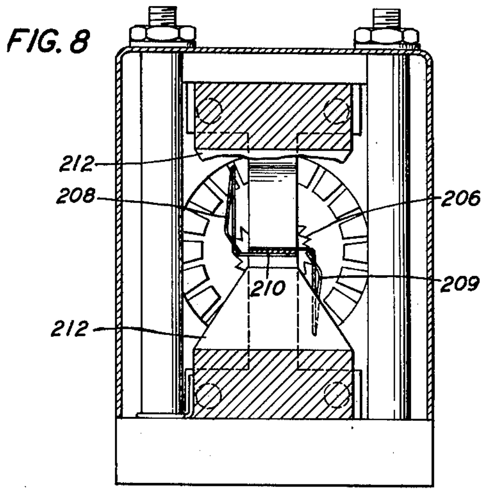
Fig. 8 shows a section, partially broken away, taken along section line 8 of Fig. 6.
Figure 9:
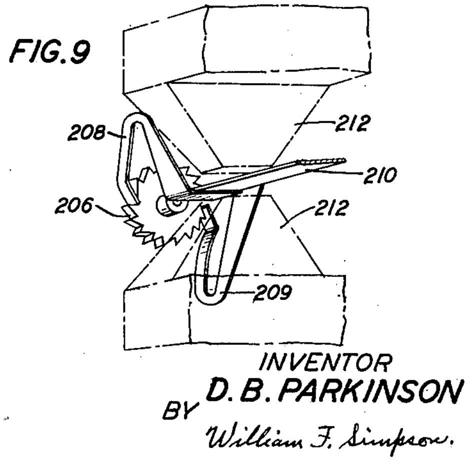
Fig. 9 is a partial disclosure of the stepping mechanism showing the pole-pieces, the armature and stepping pawls, and the ratchet wheel.

In the modification of this invention shown in Fig. 4, the alternating current to energize the stepping device and provide the excitation current for the pulsing transformers is supplied through a simplex circuit. The alternating current is applied between the two line conductors 125 and ground. The interconnection between the source of alternating current and the two line conductors is simplex coil 200 having similar electrical properties to simplex coil 204. The source of alternating current is connected between the center tap of coil 200 and ground through transformer 201. Thus, the potential between the center tap of coil 204 and ground corresponds to the potential developed across the secondary of transformer 201. In this manner the alternating current to operate the stepping mechanism and to serve as the excitation current for the pulsing transformers is transmitted over the telephone line.

In operating the calling device in accordance with this invention, the subscriber will first position the dials or finger wheels 21 through 28, inclusive, in accordance with the digits, characters or symbols of the called subscriber's station designation or number. Actuation of these selecting devices will cause the members 21 through 28 to selectively make contact with the bus-bars 61 through 70, and thus contact with the various taps of the input winding of the pulse coil 301 connected to phase B and network 203. Thereafter the subscriber will initiate a call which in turn causes alternating-current power to be applied between both conductors to the subscriber's line 125 and ground, through transformer 201 and simplex coil 200, for example. The alternating current is then transmitted to the subscriber's station where it actuates the stepping magnet 211 and causes the brush arms 113 and 81 to rotate one step for each half cycle of alternating current. Likewise, during each half cycle of the alternating current, a start pulse is generated in the output winding of the start pulse coil 310 and a pulse is also generated at a later interval of time during the same half cycle in the output winding of the stop pulse coil 301.

Assuming that the distributor brush arms 113 and 81 start from the position shown and are rotated in a clockwise direction by the stepping magnet 211, during the first half cycle of the alternating current arms 113 and 81 will complete a circuit from segment 91 to ground and between segments 80 and 82, respectively. In completing a circuit between segments 80 and 82 the output windings of coils 301 and 310 are connected through the pulse-forming network or condenser 205 to the conductors of the subscriber's line 125 extending to the central station. The connection of segment 91 to ground through brush 113 and segment 114 connects ground to one of the taps of the tapped input winding of coil 301. The particular tap to which ground is connected is controlled by the setting of the contacts carried by the dial or finger wheel 21.

During each subsequent half cycle the succeeding segments 92 through 98 are successively connected to ground and each of these segments in turn connects ground to one of the taps of the stop pulse coil 13 in accordance with the setting of the corresponding dial or finger wheel, thus causing the transmission of stop pulses at varying time intervals after the transmission of the start pulse in accordance with the setting of the various dials or hand wheels at the calling subscriber's station.

After eight digits have been transmitted the brush arms 113 and 81 make contact with no other segments, with the result that for two half cycles, that is, two steps of the stepping magnet 211, no pulses are transmitted, thus indicating that a complete calling station designation has been transmitted. Thereafter, the above cycle of operations is repeated and the various pulses repeated so long as the alternating-current power is connected to the line at the central office or some other distant station.

What is claimed is:

1. A telephone calling system comprising apparatus for generating two pulses for each digit representing a called station designation comprising a start coil having a core of saturable material, a source of alternating current, a winding interlinking said core and connected to said source of alternating current, a second coil also having a core of saturable magnetic material, and a plurality of input windings, means for supplying alternating currents of different phase to said input windings, and apparatus for controlling the number of active turns in one of said input windings in accordance with the identity of the digit to be transmitted.

2. A telephone calling system comprising apparatus for generating two pulses for each symbol of a called telephone subscriber's station designation, comprising a start coil having a core of saturable magnetic material, two windings interlinking said core, a source of polyphase alternating current, connections between said windings and said source for saturating said core once during each half cycle of said alternating current, a second coil also having a core of saturable magnetic material and a plurality of input windings, means interconnecting said windings and said source of polyphase alternating current for saturating said core during each half cycle of said alternating current, and means for controlling the number of active turns in one of said input windings of said second coil in accordance with the identity of the symbol to be transmitted.

3. A telephone calling system comprising apparatus for generating two pulses for each symbol of a called telephone subscriber's station designation, comprising a start coil having a core of saturable magnetic material, two windings interlinking said core, a source of polyphase alternating current, connections between said windings and said source for saturating said core once during each half cycle of said alternating current, a second coil also having a core of saturable magnetic material and a plurality of input windings, means interconnecting said windings and said source of polyphase alternating current for saturating said core during each half cycle of said alternating current, means for controlling the number of active turns in one of said input windings of said second coil in accordance with the identity of the symbol to be transmitted, output windings interlinking said cores, a subscriber's line, and apparatus for connecting said subscriber's line to said output windings.

4. A telephone calling system comprising apparatus for generating two pulses of alternating current for each symbol of a multisymbol subscriber's station designation comprising a start coil having a core of saturable magnetic material, a source of polyphase alternating current, means for saturating said core during each half cycle of said alternating current, a stop coil also having a core of saturable material, a distributor mechanism, means for supplying said alternating current to said distributor mechanism to cause said distributor mechanism to advance one step during each half cycle of said alternating current, a manual selector switch comprising a plurality of finger wheels, apparatus controlled by said finger wheels and said distributor for selectively controlling the energization of said second coil from said source of alternating current.

DAVID B. PARKINSON.

REFERENCES CITED

The following references are of record in the file of this patent:

UNITED STATES PATENTS

| Number | Name | Date |
|---|---|---|
| 1,972,289 | Chauveau | Sept. 4, 1934 |
| 2,085,884 | Wilkinson | July 6, 1937 |
| 2,252,766 | Holden | Aug. 19, 1941 |
| 2,499,606 | Parkinson | Mar. 7, 1950 |